(No Model.) 2 Sheets—Sheet 1.
T. SPENCER.
SYSTEM OF ELECTRIC DISTRIBUTION.
No. 378,737. Patented Feb. 28, 1888.
FIG. I.
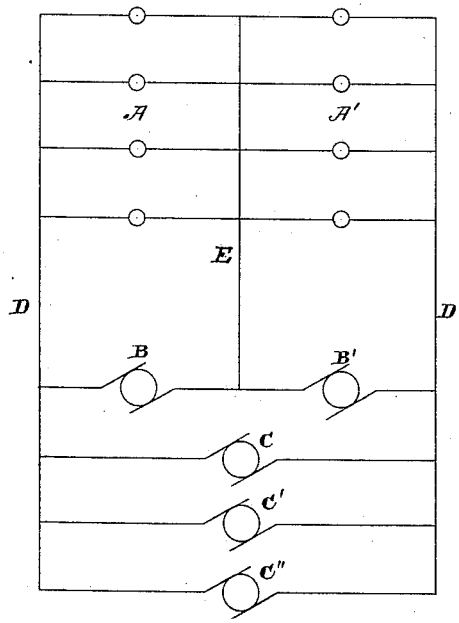
FIG. II.
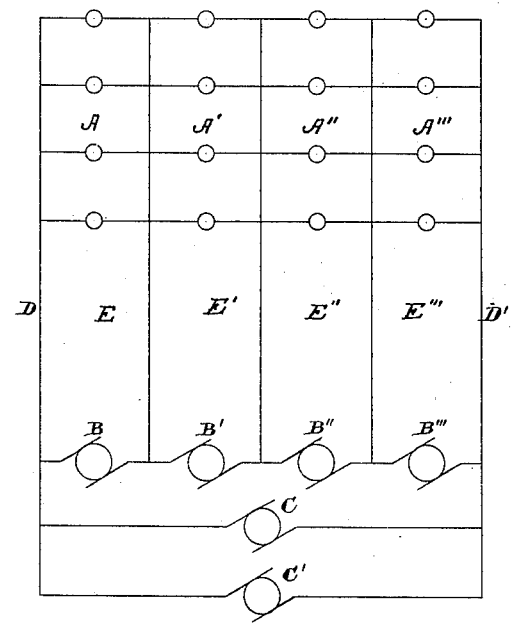
FIG. III.
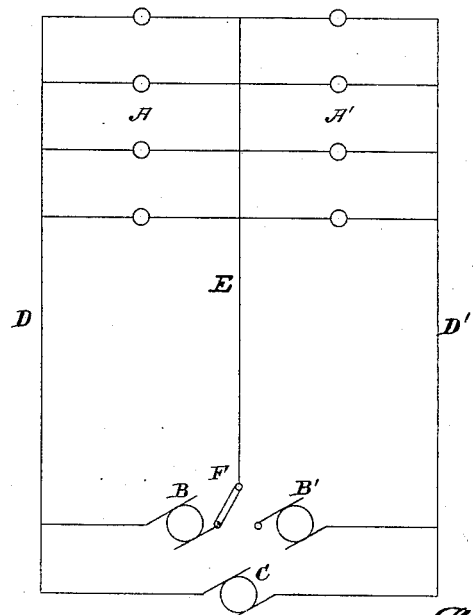
Attest:
Geo. T. Smallwood.
Edward Sten.
Inventor:
Thomas Spencer.
By Knight Bro
Attys (No Model.) 2 Sheets—Sheet 2.
T. SPENCER.
SYSTEM OF ELECTRIC DISTRIBUTION.
No. 378,737. Patented Feb. 28, 1888.
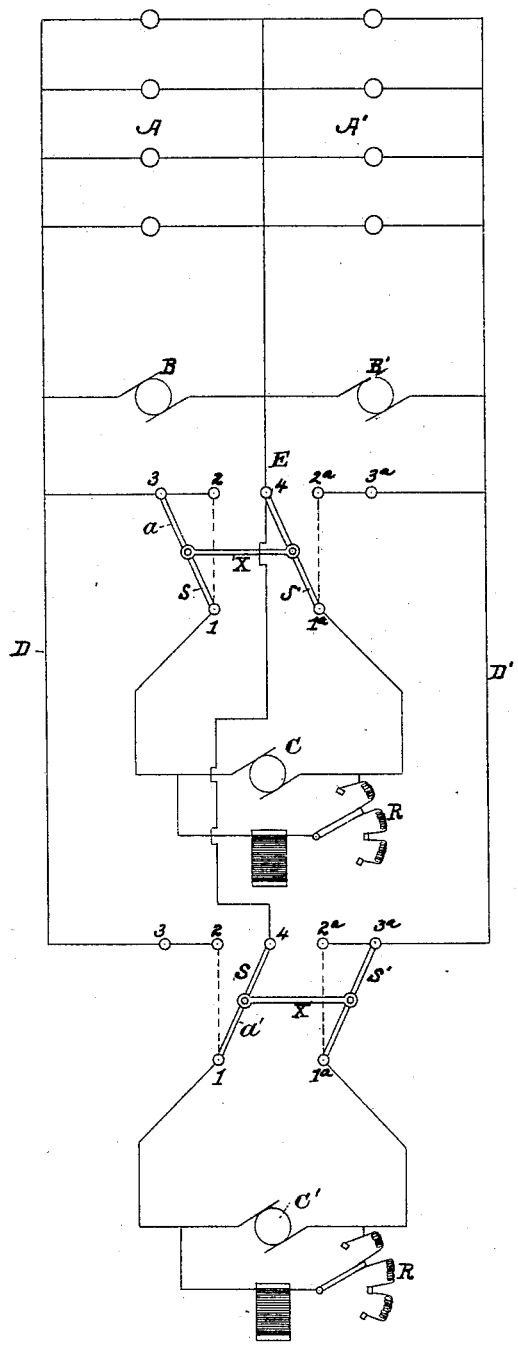

UNITED STATES PATENT OFFICE.

THOMAS SPENCER, OF WESTBROOK, CONNECTICUT.

SYSTEM OF ELECTRIC DISTRIBUTION.

SPECIFICATION forming part of Letters Patent No. 378,737, dated February 28, 1888.

Application filed June 14, 1887. Serial No. 241,280. (No model.)

*To all whom it may concern:*

Be it known that I, THOMAS SPENCER, a citizen of the United States, residing at Westbrook, in the county of Middlesex and State of Connecticut, have invented certain new and useful Improvements in Systems of Electric Distribution, of which the following is a specification.

My invention consists in an improvement upon what is commonly known as the "three-wire" system of electric distribution, which is shown and described in a patent granted to Thomas A. Edison, No. 274,290, dated March 20, 1883. In this system two or more dynamos or other electric generators are connected in series between the two main wires, and a third wire, called a "compensating" wire, is led from a point between the two generators out into the system, and electric lights or other translating devices are connected between this third wire and each of the two main wires. Any inequality between the lights on the opposite sides of this third wire is automatically compensated for by permitting the surplus current to pass along the third wire to the generator. In this system, when an increase in the amount of current upon the line is desirable, it is obtained by connecting dynamos in multiple arc with those already upon the line.

My invention consists in providing for an increase of current in such a system by adding to the dynamos already upon the line a single dynamo connected directly to the two main wires and having an electro-motive force equal to the sum of the electro-motive forces of the original dynamos, or, as I term them in my system, the "compensating" dynamos.

It has been found by experience that the irregularities in the lights upon the circuits are comparatively slight, and while the main part of the current is supplied by my high electro-motive force or "main" dynamo, as I term it, the irregularities of the whole system are taken care of by the compensating dynamos.

In my system any number of main dynamos can be connected successively to the circuit as the demand increases without increasing the number of the compensating dynamos. My system is also applicable to an arrangement where there are four or more wires in the system and a corresponding number of compensating dynamos. I have also found it possible in my system to connect the third wire to one or the other of the compensating dynamos, as occasion may demand. I have also devised an arrangement by which, should the compensating dynamos become disabled, any two main dynamos may be used in their place in the third-wire system by connecting them in series and to the third wire in the usual manner. When this is done, the electro-motive force must be reduced in any well-known manner to that of the original compensating dynamos.

My invention is illustrated in the accompanying drawings, in which—

Figure I is a diagram of the generators, lamps, and circuits. Fig. II is a diagram showing the application of my invention to a compensating system wherein more than three wires are used. Fig. III shows the third wire with a switch for connecting it to one or the other of the two compensating dynamos, and Fig. IV shows the method of connecting two main dynamos in series to take the place of two disabled compensating dynamos.

In Fig. I, B B′ are two dynamos in an ordinary three-wire system connected in series between the two main wires D and D′. E is a third wire connected between a point between the two dynamos, and A A′ represent groups of lamps in multiple arc, the groups being connected between the third wire, E, and the two main wires D and D′, respectively. C, C′, and C″ are respectively three dynamos, which I term "main" dynamos, each giving an electro-motive force equal to the sum of the electro-motive forces of the dynamos B B′, and adapted to be connected directly to the two mains D and D′ as occasion may demand. In this system all irregularities between the groups A and A′ of lamps or other translating devices will be compensated by the dynamos B and B′, while the main load will be taken by the main dynamos C, C′, and C″, &c., or as many of them as may be in the circuit.

In Fig. II the application of my invention to a system where more than three wires are used will be readily comprehended. In all cases, however, the main dynamos C C′ must have an electro-motive force equal the total electro-motive forces of the compensating dynamos.

In Fig. III the third wire, E, is provided with a switch, F, by which it may be connected to either one of the compensating dynamos B or B'. This arrangement will be found useful where one of the groups A A' is largely in excess of the other.

In Fig. IV, I have shown two switches, $a$ and $a'$, corresponding to the two main dynamos C and C', adapted to throw the two machines from the ordinary multiple-arc arrangement into series, so that they may take the place of the two compensating dynamos D and D' in case of an emergency. These switches may consist of the pivoted arms S S', connected by the cross-bar X, and the contacts 2, $2^a$, 3, $3^a$, and 4. The contacts 2 3 and $2^a$ $3^a$ are on branches of the main wires D D' and the contact 4 on the third wire, while the pivoted ends 1 and $1^a$ of the switch are connected, respectively, to the positive and negative poles of the source. With this arrangement three changes may be made. First, the movable ends may be on the contacts 2 and $2^a$, when the main dynamos will be in multiple arc. Second, the ends may be brought on the contacts 3 2, when the main dynamos will be connected with their negative poles to the central wire (as well as to the main wire D') and their positive poles to the main wire D; and, third, the reverse of the second position may be obtained by moving the switches S and S' onto the contacts 4 and $3^a$, respectively. By moving the switches to their extreme positions in opposite directions the main dynamos will be arranged in series and connected with the third wire between them. It will in this case be necessary, of course, to reduce the electro-motive force of the machines C and C' until the sum of their electro-motive forces equals that of the two compensating dynamos. This can be done in any well-known manner—as, for instance, by inserting a resistance, R, in the field-magnet circuit, the machine being shunt-wound.

Having thus described my invention, the following is what I claim as new therein and desire to secure by Letters Patent:

1. In a compensating system of electric distribution, the combination, with two compensating dynamos connected in series, of the two main wires, a third wire leading from a point between the two dynamos, translating devices between each of the said main wires and the third wire, and a main dynamo adapted to give an electro-motive force equal to the total electro-motive force of the said two dynamos connected directly to the two main wires.

2. In a system of electric distribution, the combination of two or more compensating dynamos in series, groups of translating devices connected in series between the two main wires, compensating wires leading from points between the dynamos to points between the groups of translating devices, and a main dynamo connected directly to the two main wires and adapted to give an electro-motive force equal to the total electro-motive force of the compensating dynamos.

3. In a system of electric distribution, the combination of a main dynamo connected to the two main wires, a compensating dynamo, groups of translating devices in series between the said main wires, and a third wire leading from a point between the said groups to one terminal of the compensating dynamo, the other terminal being connected to one of the main wires.

4. In a system of electric distribution, the combination of the main wires D and D', the main dynamos C and C', normally in multiple arc, the compensating wire E, and the switches $a$ and $a'$, adapted to connect the two dynamos in series with the main wires D D' and to a circuit leading from the wire E to a point between the two dynamos, substantially as described.

5. In a system of electric distribution, the combination of the main wires D D', the two main dynamos C and C', normally in multiple arc with the said wires, means for reducing their electro-motive force at will, the third wire, E, and a switch adapted to connect the said dynamos in series to the main wires D D' and to connect the third wire, E, to a point between the two dynamos, substantially as described.

THOMAS SPENCER.

Witnesses:
E. M. BENTLEY,
HARRY E. KNIGHT.